United States Patent
Posey

(10) Patent No.: US 6,456,238 B1
(45) Date of Patent: Sep. 24, 2002

(54) DYNAMIC SIGNAL ROUTING IN ELECTRONICALLY SCANNED ANTENNA SYSTEMS

(75) Inventor: William P. Posey, Palos Verdes Estates, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/855,472

(22) Filed: May 15, 2001

(51) Int. Cl.$^7$ ................................................. G01S 5/02
(52) U.S. Cl. ........................ 342/427; 342/80; 342/149; 342/154
(58) Field of Search ........................ 342/80, 149, 152, 342/153, 154, 427

(56) References Cited

U.S. PATENT DOCUMENTS 5,359,329 A * 10/1994 Lewis et al.

\* cited by examiner

Primary Examiner—Theodore M. Blum

(74) Attorney, Agent, or Firm—Leonard A. Alkov; Glenn H. Lenzen, Jr.

(57) ABSTRACT

An antenna array system with dynamic signal routing to a set of receivers. A monopulse electronically scanned antenna (ESA) has a plurality of antenna elements divided into subarrays. ESA beam steering phase shifters are associated with the respective subarrays of antenna elements, such that the output signals from the respective antenna elements associated with the respective quadrants are phase shifted and summed to provide respective subarray signals. A monopulse network responsive to the subarray signals provides monopulse outputs to a set of receivers. A beam steering controller provides phase shift commands to the ESA phase shifters to set the phase shift associated with the respective phase shifters of the subarrays. The controller commands the ESA phase shifters to modulate the phase shift of selected quadrants. The phase shifts associated with the subarrays are selectively set to either 0 or 180 degrees relative to one of the subarrays by adding the desired subarray phase shift (0 or 180 degrees) to the beam steering phase command at each element. This produces the main array signals. By setting the subarrays's phase shifts, the main array signals are appropriately steered to the desired receivers. The dynamic signal routing can also be used with non-electronically scanned systems.

21 Claims, 4 Drawing Sheets

| φ₂ | φ₃ | φ₄ | P₁ | P₂ | P₃ | P₄ |
|---|---|---|---|---|---|---|
| 0 | 0 | 0 | Σ | Δaz | Δel | Δx |
| π | 0 | π | Δaz | Σ | Δx | Δel |
| 0 | π | π | Δel | Δx | Σ | Δaz |
| π | π | 0 | Δx | Δel | Δaz | Σ |

DYNAMIC SIGNAL ROUTING IN ELECTRONICALLY SCANNED ANTENNA SYSTEMS

TECHNICAL FIELD OF THE INVENTION

This invention relates to antenna systems, and more particularly to techniques for dynamic signal routing in Electronically Scanned Antenna (ESA) systems.

BACKGROUND OF THE INVENTION

In a multifunction tactical radar, dynamic signal routing between a multiport antenna and a bank of receivers is usually accomplished by an RF switch network. Unavoidable switch non-idealities such as impedance mismatches, signal attenuation, signal leakage, and dynamic range limitations are drawbacks to this approach and usually have significant radar system performance implications. The switches themselves also introduce undesirable single point failure modes.

FIG. 1 shows a conventional system architecture having an electronically scanned antenna partitioned into four quadrants (Quad 1, Quad 2, Quad 3, Quad 4) feeding a conventional monopulse combiner. The outputs of the monopulse combiner are Sum (Quad 1+Quad 2+Quad 3+Quad 4), Delta Azimuth (Quad 1+Quad 3−Quad 2−Quad 4), Delta Elevation (Quad 1+Quad 2−Quad 3−Quad 4), and Delta X (Quad 1+Quad 4−Quad 2−Quad 3). These signals are typically connected to a bank of receivers via a switch network, as shown. The switch network provides the desired dynamic routing of the antenna outputs to the individual receivers. In some cases, the sum channel would be directly connected to a receiver to avoid the switch losses, reflections, distortions, and leakage in the sum signal path resulting in a loss of system availability if that receiver fails.

The conventional approach has several drawbacks overcome by this invention. The non-idealities of the RF circuits and switches used in the switch network degrade the radar return signals at a critical point in the signal path, significantly affecting radar performance. The switch network includes single point failure mechanisms that could render one or more of the critical antenna monopulse signals inoperative, likely degrading system performance below useful levels. The addition of the switch network increases system cost and complexity.

SUMMARY OF THE DISCLOSURE

An array system with dynamic signal routing is described, and includes a plurality of antenna elements divided into a plurality of subarrays. A summing network for each subarray combines the signals from each antenna element in a subarray to provide for each subarray a subarray signal. Phase shifting apparatus selectively introduces a signal routing phase shift of 0° or 180° to the respective subarray signals. A monopulse combiner is responsive to the subarray signals to provide a plurality of combiner outputs. The system can include a plurality of receivers each having an input connected to receive a corresponding combiner output for processing the monopulse combiner outputs. A controller providing phase shift commands to the phase shifting apparatus to modulate the phase shift of the phase shifters of selected subarrays by adding a subarray phase shift of 0° or 180° to dynamically effect the routing of the monopulse array output signals to desired ones of the receivers.

Modern multifunction tactical radars employ ESAs that are partitioned into subarrays. The ability to dynamically rout the various antenna array and subarray outputs to a bank of receivers is very desirable. Dynamic signal routing in accordance with the invention allows the antenna outputs to be time multiplexed between fewer receivers than the total number of antenna outputs. This flexible signal routing also allows reconfiguration to compensate for failed receivers.

In accordance with an aspect of the invention, an ESA is described with dynamic signal routing to a set of receivers. A monopulse ESA has a plurality of antenna elements divided into subarrays. ESA beam steering phase shifters are associated with the respective subarrays of antenna elements, such that the output signals from the respective antenna elements associated with the respective subarrays are phase shifted and summed to provide respective subarray signals. A monopulse combiner responsive to the subarray signals provides monopulse outputs to the set of receivers. A beam steering controller provides phase shift commands to the ESA phase shifters to set the phase shift associated with the respective phase shifters of the subarrays. In addition to supplying a beam steering phase shift to each ESA phase shifter, the controller commands the ESA phase shifters to modulate the phase shift of selected subarrays. The phase shifts associated with the subarrays are selectively set to either 0 or 180 degrees relative to the one of the subarrays by adding the desired subarray phase shift (0 or 180 degrees) to the beam steering phase shift at each element.

In an exemplary embodiment, the subarrays represent quadrants, and the monopulse output signals are Sum, Delta Azimuth, Delta Elevation, and Delta X; by setting the quadrant phase shifts, the monopulse output signals are appropriately steered to the desired receivers.

The dynamic signal routing technique can also be applied to arrays which are not electronically scanned.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE DISCLOSURE

The disclosed invention is an approach for dynamically routing the main array signals (in this embodiment, Sum, Delta Azimuth, Delta Elevation, and Delta X) using the monopulse combiner instead of a conventional RF switch network. This results in a simpler, lower cost design and avoids the performance and reliability drawbacks of the conventional approach.

Figure 2:
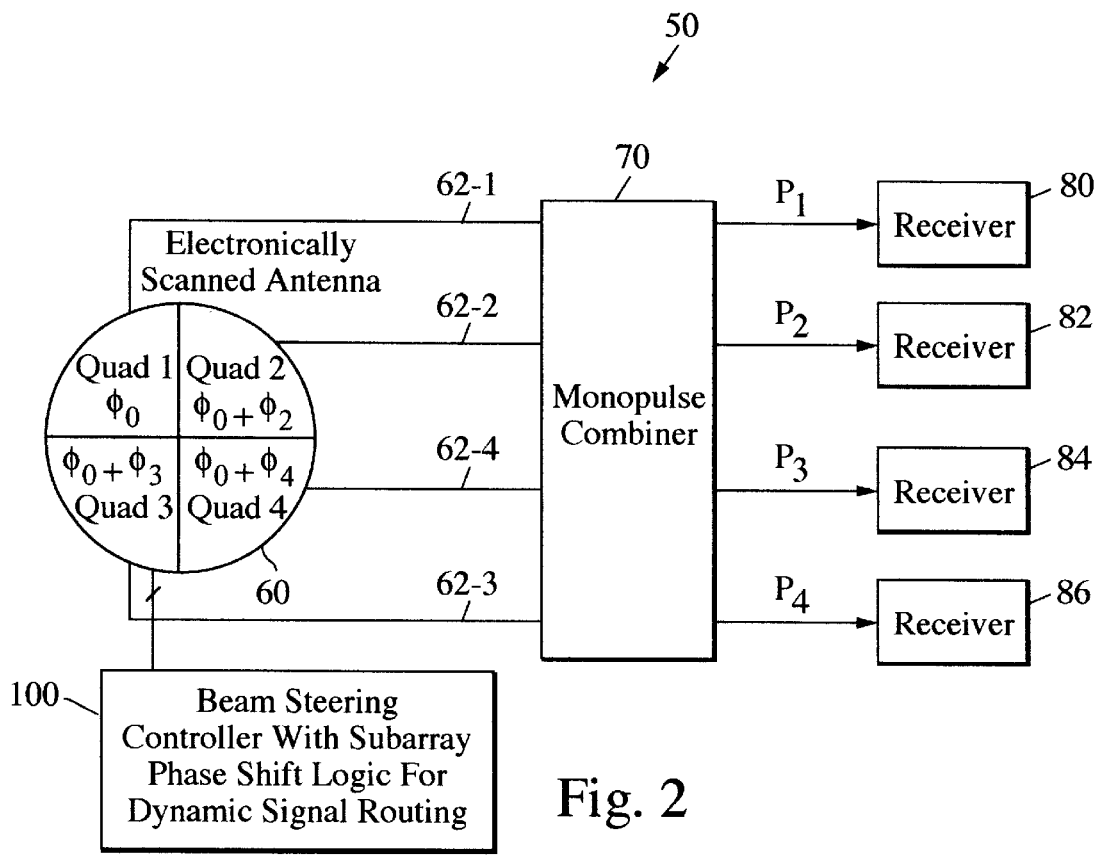
FIG. 2 illustrates in block diagram form an electronically scanned monopulse antenna system embodying the invention.

FIG. 2 illustrates in block diagram an ESA 50 employing aspects of this invention. The system includes an ESA 60 divided into four subarrays, in this case quadrants 1–4. The invention is not limited to ESAs with quadrant partitioning, and can be employed with subarrays other than quadrants. The antenna element outputs within the first quadrant are all phase shifted and summed to provide a first quadrant output signal $S_1$ on line 62-1. The antenna elements within the second quadrant are all phase shifted and summed to provide a second quadrant output signal S2 on line 62-2. The antenna elements within the third quadrant are all phase shifted and summed to provide a third output quadrant signal $S_3$ on line 62-3. The antenna elements within the fourth quadrant are all phase shifted and summed to provide a fourth quadrant output signal $S_4$ on line 62-4.

Figure 3:
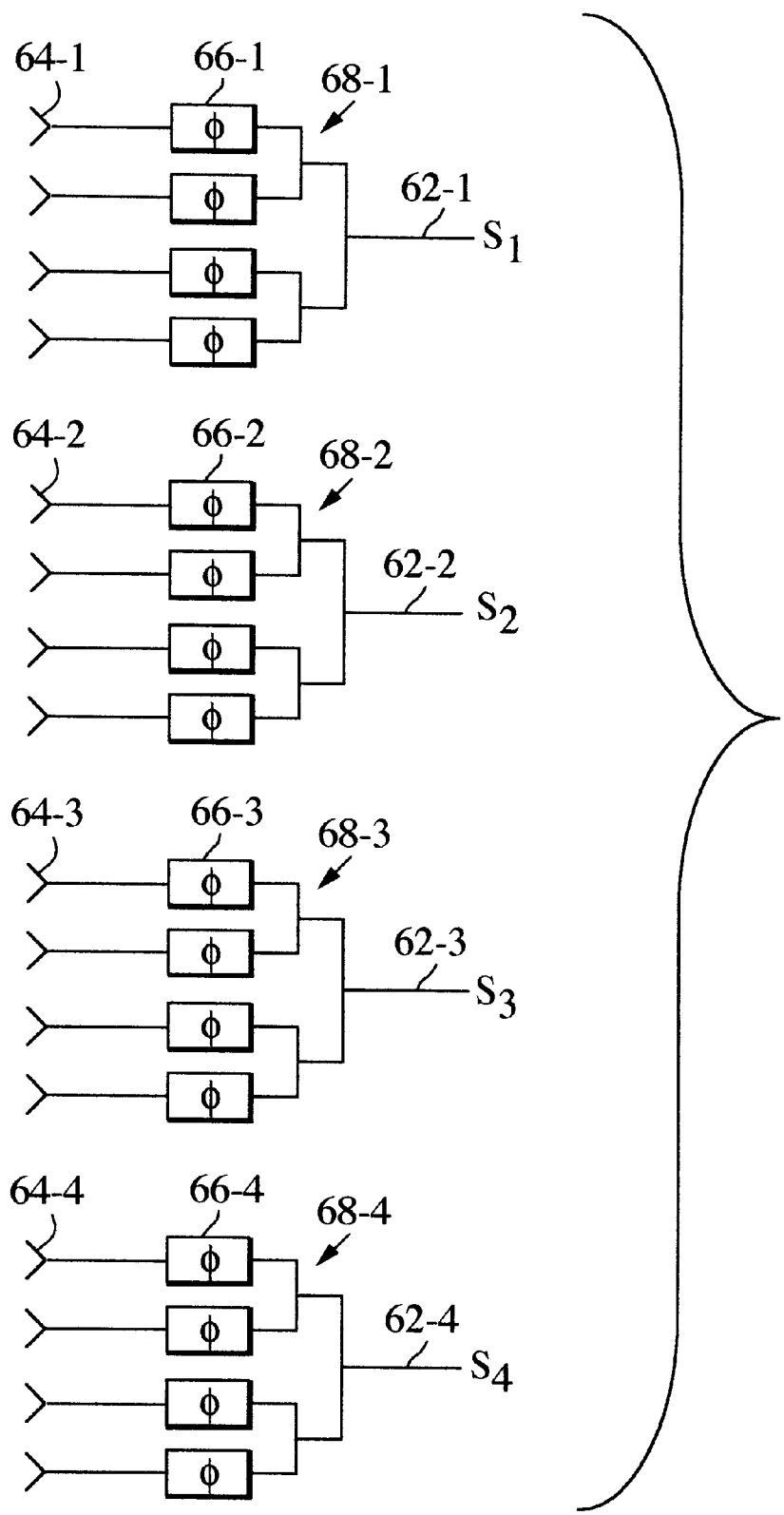
FIG. 3 is a simplified schematic diagram of the ESA of FIG. 2.

FIG. 3 is a simplified schematic diagram of the ESA 60. Each subarray, i.e. each quadrant in this exemplary embodiment, includes a plurality of radiating elements, a plurality of phase shifters and a subarray summing manifold. Thus, quadrant 1 includes a plurality of radiating elements 64-1, a corresponding plurality of phase shifters 66-1, and a quadrant summing manifold 68-1 for summing the respective phase shifted outputs of the radiating elements 64-1, with the quadrant 1 summed and phase shifted output $S_1$ on line 62-1. Similarly, quadrant 2 includes a plurality of radiating elements 64-2, a corresponding plurality of phase shifters 66-2, and a quadrant summing manifold 68-2, with the quadrant 2 phase shifted and summed output S2 on line 62-2. Quadrant 3 includes a plurality of radiating elements 64-3, a corresponding plurality of phase shifters 66-3, and a quadrant summing manifold 68-3, with the quadrant 3 phase shifted and summed output S3 on line 62-3. Quadrant 4 includes a plurality of radiating elements 64-4, a corresponding plurality of phase shifters 66-4, and a quadrant summing manifold 68-4, with the quadrant 4 phase shifted and summed output S4 on line 62-4.

Figures 4, 5:
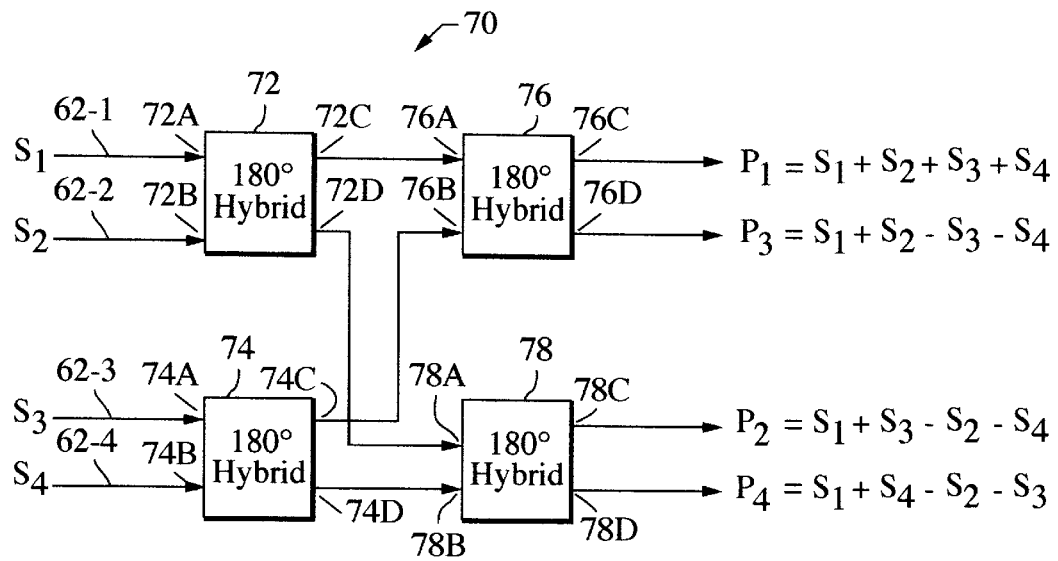
FIG. 4 is a simplified schematic diagram of the monopulse combiner of FIG. 2.
FIG. 5 is a table showing the monopulse combiner outputs in tabular form as a function of the quadrant phase shift settings.

A monopulse combiner 70 is responsive to the four phase shifted and summed quadrant signals 62-1 to 62-4 to provide outputs P1–P4 to respective receivers 80–86. The monopulse combiner is a conventional circuit, a network of 180° hybrids that form algebraic combinations of the quadrant outputs. FIG. 4 is a simplified schematic diagram of the monopulse combiner 70. The monopulse combiner comprises four 180° hybrid circuits 72, 74, 76, 78. Outputs $S_1$ and $S_2$ are respectfully coupled to the input ports 72A, 72B of hybrid 72. Outputs $S_3$ and $S_4$ are respectfully coupled to the input ports 74A, 74B of hybrid 74. The sum port 72C of hybrid 72 is coupled to input 76A of hybrid 76. The difference port of hybrid 72 is coupled to an input 78A of hybrid 78. The sum port 74C of hybrid 74 is coupled to input 76B of hybrid 76. The difference port 74D of hybrid 74 is coupled to input 78B of hybrid 78.

The monopulse combiner 70 forms combinations $P_1$, $P_2$/$P_3$ and $P_4$.

$$P_1=S_1+S_2+S_3+S_4.$$

$$P_2=S_1+S_3-S_2-S_4.$$

$$P_3=S_1+S_2-S_3-S_4.$$

$$P_1=S_1+S_4-S_2-S_4.$$

The ESA beam steering phase shifters 66 are used to independently set the phase shift of each radiating element in order to steer the antenna beam in the desired direction. In addition to applying the beam steering phase shifts, the phase shifters 66 are also used to modulate the phase of selected quadrants. The phase shift of quadrants 2, 3 and 4 will be set to either 0 or 180 degrees relative to quadrant 1 by adding the desired additional quadrant phase shift (0 or 180 degrees) to the beam steering phase shift provided by the beam steering controller 100 for each respective phase shifter 66, i.e. the commanded phase shift for these quadrants can have two components, a first component for the beam steering and a second component for the dynamic signal routing function. The monopulse combiner now has the outputs shown in tabular form in FIG. 5, as a function of the quadrant phase shift settings $(\theta_1,\theta_2,\theta_3,\theta_4)$ to accomplish dynamic signal routing. Setting the quadrant phase shifts appropriately effectively steers the monopulse combiner outputs to the desired receivers. As shown in FIG. 4, the outputs ($P_1$, $P_2$, $P_3$, $P_4$) of the monopulse combiner are the algebraic combinations of the input signals $S_1$, $S_2$, $S_3$, $S_4$. If the quadrant outputs are left unmodulated, i.e. without introducing additional phase shifts (0° or 180°) as described above, the combiner outputs become:

$$P_1=S_1+S_2+S_3+S_4=\text{Sum}.$$

$$P_2=S_1+S_3-S_2-S_4=\Delta\text{Azimuth}.$$

$$P_3=S_1+S_2-S_3-S_4=\Delta\text{Elevation}.$$

$$P_4=S_1+S_4-S_2-S_4=\Delta\text{X}.$$

Adding a 180° phase shift to the commanded beam steering phase shift at each element in a given quadrant effectively negates the quadrant output, i.e. multiplies it by negative one. For example, if 180° is added to the phase shifts in quadrants 2 and 4, the monopulse combiner outputs become:

$$P_1=S_1-S_2+S_3-S_4=\Delta\text{Azimuth}.$$

$$P_2=S_1+S_2+S_3+S_4=\text{Sum}.$$

$$P_3=S_1-S_2-S_3+S_4=\Delta\text{X}.$$

$$P_4=S_1+S_2-S_3-S_4=\Delta\text{Elevation}.$$

Figure 1:
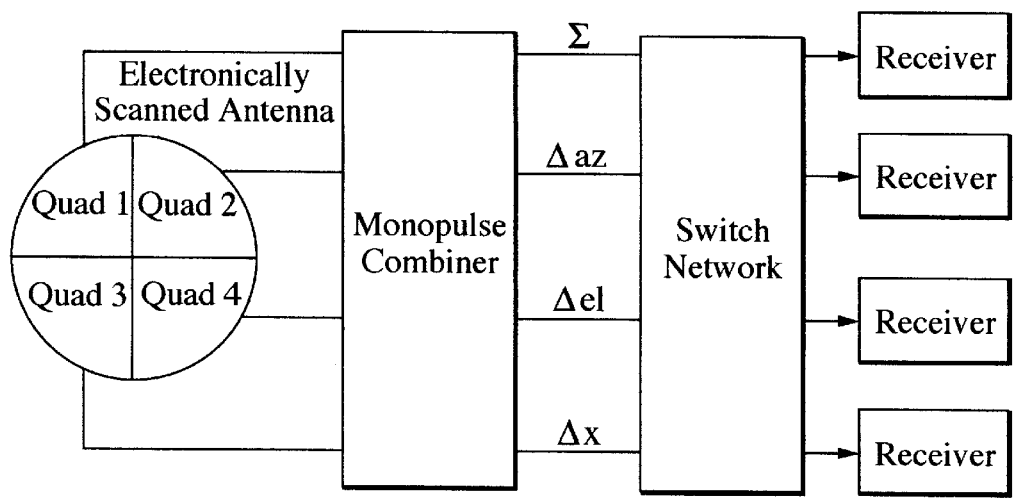
FIG. 1 shows a conventional system architecture having an ESA partitioned into four quadrants feeding a conventional monopulse combiner.

While this technique provides less routing flexibility than a full 4 by 4 RF crossbar switch typically used as shown in the system of FIG. 1., it will allow the desired signal routing around a failed receiver or allow 3 receivers to be time shared between the four monopulse outputs.

Since the signal routing approach uses the existing ESA beam steering phase shifters, it can be accomplished by simply adding a small amount of additional logic to the beam steering controller 100 to effect the quadrant by quadrant phase shifts. In essence, in accordance with one aspect of the invention, the monopulse outputs of an ESA can be dynamically routed to a bank of receivers without adding any additional RF hardware to the system and without introducing any RF signal degradation.

Figure 6:
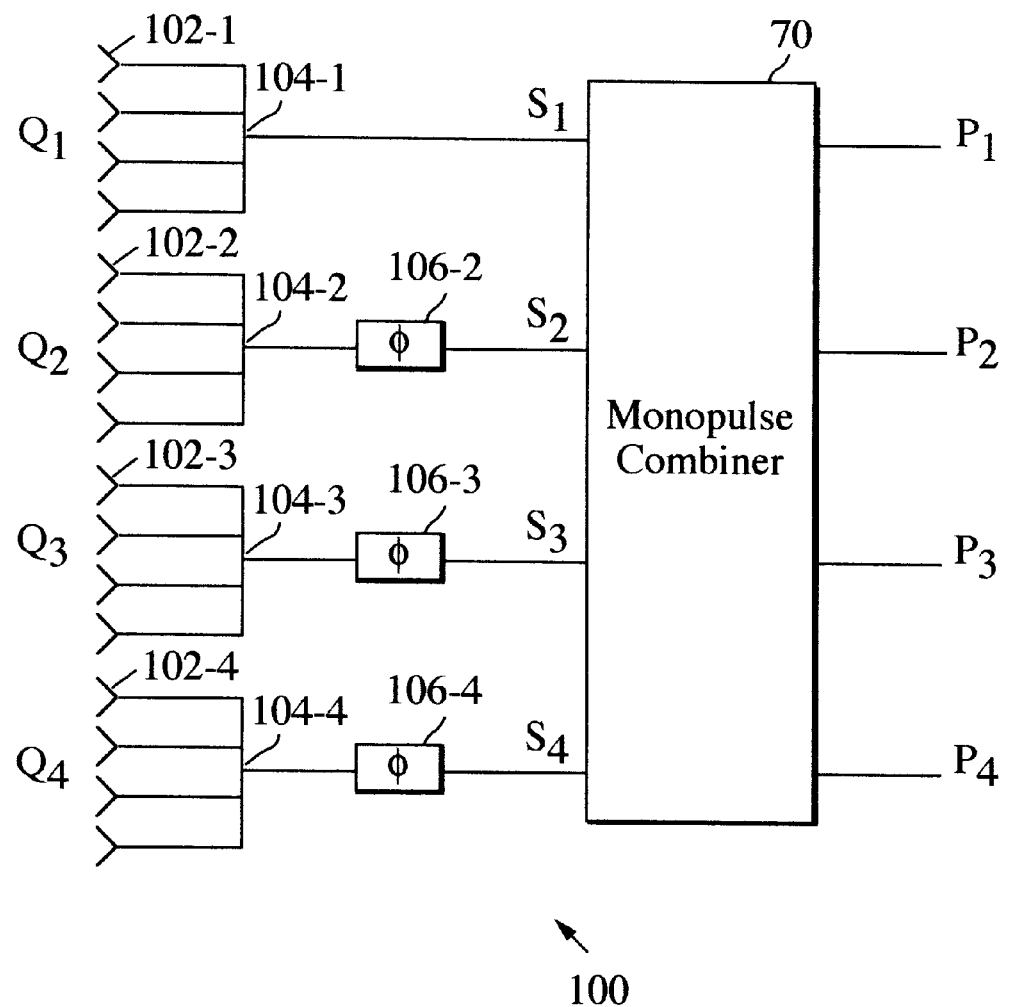
FIG. 6 is a simplified schematic block diagram of a non-electronically scanned array employing dynamic signal routing in accordance with the invention.

In an alternate architecture, the dynamic signal routing can be implemented by the addition of a phase shifter for each of the second, third, . . . nth subarrays, to selectively add the 0° or 180° phase shift to the subarrays relative to the first subarray. There would be no advantage to doing this in a fully configured ESA, which already has phase shifters at each radiating element for beam steering purposes. However, for non-ESA antennas, such as a mechanically steered array or a stationary array, the dynamic signal routing can be achieved by the use of such a phase shifter for the subarrays to introduce the 0°/180° phase shift. Such an arrangement is illustrated in FIG. 6, which shows array 100 comprising radiating elements divided into subarrays, here quadrants Q1–Q4. The signals from radiating elements 102-1 of quadrant Q1 are combined by combiner network 104-1, and the summed signal provides signal S1 to the monopulse combiner 70. The signals from radiating elements 102-2 of quadrant Q2 are combined by combiner network 104-2, and the summed signal passed through the dynamic signal routing phase shifter 106-2 to provide signal S2 to the monopulse combiner 70. The signals from radiating elements 102-3 of quadrant Q3 are combined by combiner network 104-3, and the summed signal passed through the dynamic signal routing phase shifter 106-3 to provide signal S3 to the monopulse combiner 70. The signals from radiating elements 102-4 of quadrant Q4 are combined by combiner network 104-4, and the summed signal passed through the dynamic signal routing phase shifter 106-4 to provide signal S4 to the monopulse combiner 70. By selecting the 0°/180° state of the phase shifters 106-2 to 106-4 (quadrant Q1 is the reference quandrant, and so a dynamic signal routing phase shifter is not required for quadrant Q1), the monopulse outputs P1–P4 can be steered to respective receivers (not shown in FIG. 6) in the same manner as described above with respect to FIGS. 1–5.

While the foregoing embodiments have been described in terms of operation on receive, it is to be understood that principles of reciprocity apply to the array systems, and that the systems can also be used on transmit.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An array system, comprising:
    a plurality of antenna elements divided into a plurality of subarrays;
    a summing network for each subarray for combining the signals from each antenna element in a subarray to provide for each subarray a subarray signal;
    phase shifting apparatus for selectively introducing a signal routing phase shift of 0° or 180° to the respective subarray signals;
    a monopulse combiner responsive to the subarray signals to provide a plurality of combiner outputs;
    a plurality of receivers each having an input connected to receive a corresponding combiner output for processing the monopulse combiner outputs;
    a controller for providing phase shift commands to the phase shifting apparatus to modulate the phase shift of the phase shifters of selected subarrays by adding a subarray phase shift of 0° or 180° to dynamically effect the routing of the monopulse array output signals to desired ones of said receivers.

2. The system of claim 1, wherein the plurality of subarrays comprise first, second, third and fourth quadrants.

3. The system of claim 2 wherein the monopulse combiner output signals comprise Sum, Delta Azimuth, Delta Elevation, and Delta X monopulse signals.

4. The system of claim 1, wherein the monopulse combiner output signals include a sum signal representing a sum of the contributions from all the antenna elements comprising the array, and wherein by selection of the subarray phase shift the sum signal is dynamically routed to a first receiver or to a second receiver comprising said plurality of receivers.

5. The system of claim 1, wherein connections between the monopulse combiner and said plurality of receivers are free of any switching circuits.

6. The system of claim 1, wherein the phase shifting apparatus includes a plurality of beam steering phase shifters each coupled to a corresponding antenna element, the 0° or 180° phase shift is applied to each phase shifter in a given subarray, and wherein the controller additionally generates beam steering commands to the beam steering phase shifters to steer the array beam to a desired direction.

7. The system of claim 1, wherein there are n subarrays, and the beam steering apparatus includes a phase shifter for each of the second, third, . . . nth subarrays to selectively phase shift the subarray signal by 0° or 180°.

8. The system of claim 1, wherein the monopulse combiner forms algebraic combinations of the subarray signals.

9. An array system, comprising:
    a plurality of antenna elements divided into a plurality of subarrays;
    a plurality of beam steering phase shifters each coupled to a corresponding antenna element;
    a summing network for each subarray for combining the phase shifted signals from each antenna element in a subarray to provide for each subarray a subarray signal;
    a monopulse combiner responsive to the subarray signals to provide a plurality of combiner outputs;
    a plurality of receivers each having an input connected to receive a corresponding combiner output for processing the monopulse combiner outputs;
    a beam steering controller for providing phase shift commands to the phase shifters to set the phase shift associated with the respective phase shifter to steer an array beam to a desired direction, and to modulate the phase shift of the phase shifters of selected subarrays, by adding a subarray phase shift command of 0° or 180° to the beam steering phase command at each element, to dynamically effect the routing of the monopulse array output signals to desired ones of said receivers.

10. The system of claim 9, wherein the plurality of subarrays comprise first, second, third and fourth quadrants.

11. The system of claim 10 wherein the monopulse combiner output signals comprise Sum, Delta Azimuth, Delta Elevation, and Delta X monopulse signals.

12. The system of claim 9, wherein the monopulse combiner output signals include a sum signal representing a sum of the contributions from all the antenna elements comprising the array, and wherein by selection of the subarray phase shift signal the sum signal is dynamically routed to a first receiver or to a second receiver comprising said plurality of receivers.

13. The system of claim 9, wherein connections between the monopulse combiner and said plurality of receivers are free of any switching circuits.

14. A method for dynamically routing monopulse array signals to respective receivers in an electronically scanned antenna (ESA) array system, comprising:
    arranging a plurality of antenna elements into a plurality of subarrays;
    phase shifting the signal contributions from the antenna elements to steer an array beam to a desired direction;
    combining the phase shifted contributions from the antenna elements for each respective subarray to produce a summed subarray signal;
    combining the respective subarray signals to produce a plurality of combiner outputs, each output a algebraic combination of the subarray signals;
    processing each combiner output by a corresponding receiver;

selectively introducing for each subarray a subarray phase shift of 0° or 180° to electronically alter the plurality of algebraic combinations to dynamically route a given algebraic combination to a desired one of said receivers.

15. The method of claim 14, wherein:

arranging the antenna elements into a plurality of subarrays comprise arranging the antenna elements into first, second, third and fourth antenna quadrants.

16. The method of claim 15 wherein the algebraic combinations comprise sum, delta azimuth, delta elevation, and delta X monopulse signals.

17. The method of claim 14, wherein the algebraic combinations include a sum signal representing a sum of the contributions from all the antenna elements comprising the array, and wherein by selection of the subarray phase shift signal the sum signal is dynamically routed to a first receiver or to a second receiver comprising said plurality of receivers.

18. The method of claim 14, further comprising respectively connecting the combiner outputs to a corresponding receiver without passing the combiner outputs through any switching circuits.

19. An active array system, comprising:

a monopulse electronically scanned antenna (ESA) comprising a plurality of antenna elements divided into first, second, third and fourth quadrants;

said ESA including ESA beam steering phase shifters associated with the respective quadrants of antenna elements;

wherein the antenna elements associated with the respective quadrants are phase shifted and summed to provide respective quadrant signals;

a monopulse combiner responsive to the four quadrant signals to provide monopulse outputs to respective receivers;

a beam steering controller for providing phase shift commands to the ESA phase shifters to set the phase shift associated with the respective phase shifter;

wherein the ESA beam steering phase shifters are used to modulate the phase shift of selected quadrants, wherein the phase shift associated with the second, third, and fourth quadrants are selectively set to either 0 or 180 degrees relative to the quadrant by adding the desired quadrant phase shift (0° or 180°) to the beam steering phase command at each element, to produce monopulse array output signals, and setting the quadrant phase shifts appropriately effectively steers the monopulse array output signals to the desired receivers;

a plurality of receivers responsive to the monopulse network outputs for processing the monopulse combiner outputs.

20. The system of claim 19 wherein the monopulse array output signals comprise Sum, Delta Azimuth, Delta Elevation, and Delta X monopulse signals.

21. The system of claim 19, wherein connections between the monopulse combiner and said plurality of receivers are free of any switching circuits.

* * * * *